United States Patent Office 3,292,420
Patented Dec. 20, 1966

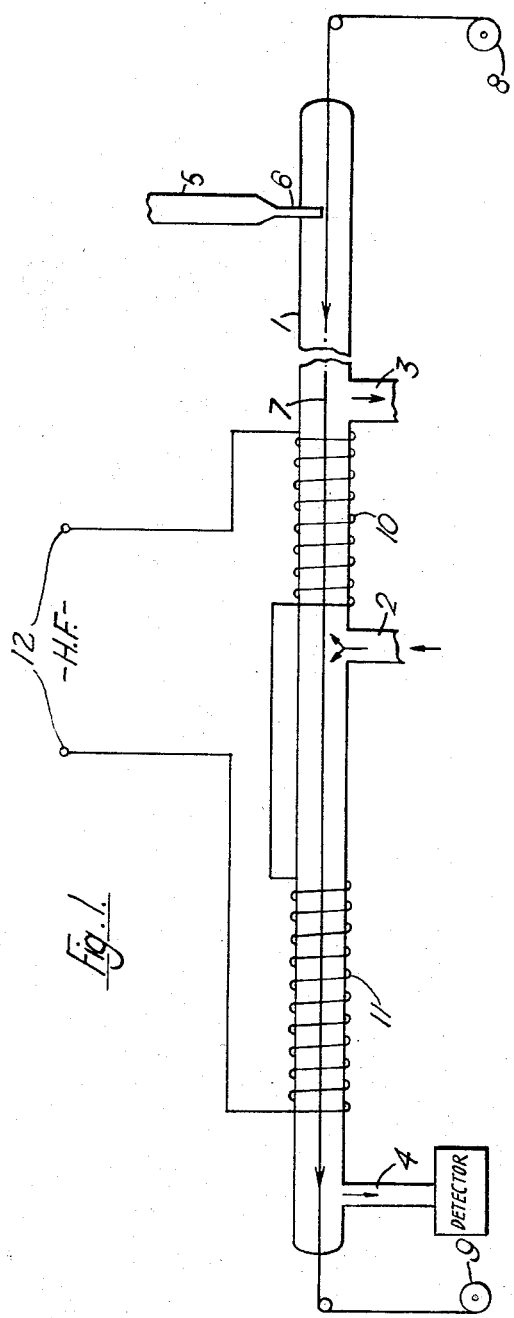

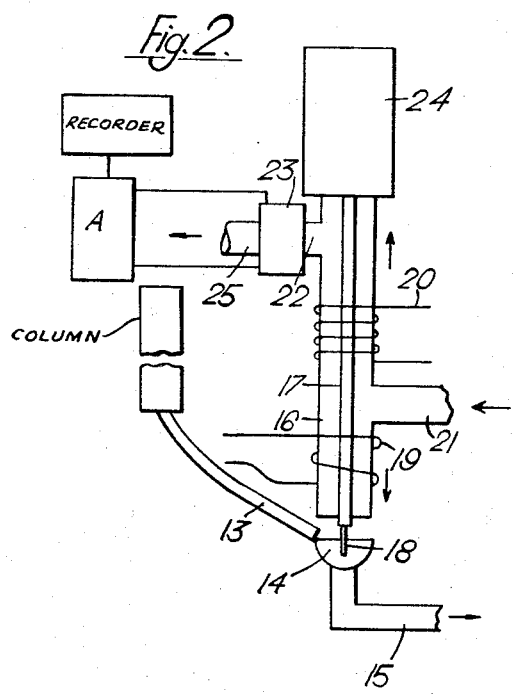

3,292,420
LIQUID CHROMATOGRAPHY
Raymond Peter William Scott, Watford, England, assignor to Pye Limited, Cambridge County, England
Filed Aug. 15, 1963, Ser. No. 302,272
Claims priority, application Great Britain, Aug. 15, 1962, 31,246/62
5 Claims. (Cl. 73—23.1)

It is extremely difficult to separate very high molecular weight substances by means of gas chromatography. This is due to the fact that the vapor pressures of these substances are very low, even at 300° C., the maximum working temperature of a gas chromatograph. The chromatographic system that lends itself to the separation of high molecular weight substances is the liquid chromatograph. This system has been used in the past, but very inefficiently, as there are no satisfactory detecting systems for use with liquid mobile phases. When a small quantity of a solute vapor is present in a gas, this can radically affect the properties of the gas, and makes detection relatively simple. Small traces of substances dissolved in a liquid, however, may not appreciably modify its properties and therefore the detection of these substances is more difficult.

The present invention provides a liquid chromatographic system in which the volatility of the mobile liquid is used in such a manner that detection can be effected by a gas chromatographic detector.

A feature of the invention is a liquid chromatographic apparatus in which a solid body is used to carry away, as a surface film, a sample of the eluent from the chromatographic column. After subjecting the sample to conditions which cause evaporation of the carrying liquid, the deposit may be presented to a detector or analyser, for example a flame ionization detector.

According to the invention a method of detecting or analysing substances using a liquid chromatographic column comprises bringing a solid body into contact with the eluent of the column, subsequently evaporating the adhering liquid to leave a deposit on the body and then introducing the latter to a detector, for example a flame ionization detector or an argon detector.

The above and other features of the invention will be more readily understood by a perusal of the following description having reference to the accompanying drawings of which FIGURE 1 illustrates diagrammatically an apparatus according to the invention and FIGURE 2 illustrates diagrammatically a modification thereof.

In FIGURE 1 a glass tube 1 has an inlet 2 to a supply of argon gas and has two exits 3 and 4. The exit 3 is to waste whereas the exit 4 is to a conventional macro-argon detector or the like. A chromatographic column 5 has a nozzle 6 which enters the tube 1 through which a wire 7 is adapted to be passed from a feed spool 8 to a take-up spool 9. H.F. heater coils 10 and 11 encircle the tube 1 as shown and are suitably energized from terminals 12 of a source of electrical energy. The wire 7 is preferably of iron coated with a layer of glass fibre. As the wire 7 passes the nozzle 6 it receives a deposit of eluent from the column 5. The coated wire passes into the field of the coil 10 which is at a temperature just sufficient to volatilize the solvent from the wire, leaving upon it a solute deposit. The argon stream removes the solvent vapor from the region of the heater 10 and passes to waste 3. The wire continues movement until the solute deposit reaches the coil 11 whose temperature is such that the deposit is pyrolyzed. The streams of argon gas passing in this portion of the tube sweeps solute products through a detector coupled to the exit 4. The openings at each end of the tube 1 are sufficiently small to prevent any appreciable escape of the gas from the wire inlet and outlet position. The detector may be of any conventional or other type which will provide an electric signal proportional to mass and the signal may be amplified and fed to a recorder.

In the modification of FIGURE 2, eluent from the column reaches a pipe 13, passes into a vessel 14 and then to a waste pipe 15. In appropriate position relative to the vessel 14 is a tube 16 which houses a dipper 17 carrying at one end a wire 18, e.g. of platinum, which may be five thousandths of an inch in diameter and 2–3 centimeters in length. About the lower end of the tube 16 is a heating coil 19 whilst over the upper part of the tube is a H.F. heater 20. If desired the coils may be positioned inside the tube. A pipe 21 connected to a source of argon gas causes a flow of the gas upwardly and downwardly through the tube 16. The gas flowing upwards passes through tube 22 which leads to an argon type detector 23. The downward flow serves to remove the solvent vapor. Such a detector can detect in the order of 12 grams per million. Suitable means, diagrammatically represented as 24, are provided for operating the dipper 17, which would in its lowermost position cause the wire 18 to dip into the eluent in the vessel 14 so that the wire may be coated with a thin film of eluent. From this position the dipper is raised, bringing the wire 18 within the influence of the heater 19. Here the liquid carrier is evaporated leaving deposits on the wire 18. In the third position the dipper is raised to bring the wire 18 into the field of the H.F. heater 20 which carbonizes the deposits and causes them to be swept away by the argon gas delivered from the tube 21. The substances are then detected by a detector indicated as 23 which may be of any well known or other appropriate type such as is used in gas chromatography. The argon gas with eluent material passes to a waste pipe 25. The output from the detector 23 is taken to the terminals of amplified A and thence to a recording instrument or the like.

Various modifications may be made in the manner of carrying out the invention described above without exceeding the scope thereof.

I claim:
1. Mass detector apparatus for a liquid chromatographic column, comprising a conduit having a tubular passage adapted to communicate near one end with the egress opening of the column, a solid carrier member, means for causing the carrier member to traverse the tubular passage and pass said opening, a first heater and a second heater spaced apart along the tubular passage, the second heater being adapted to produce a substantially higher temperature in the tube than is the first heater, means for introducing an inert gas into the passage at a point therein between the heaters, outlets for the gas from the passage, one outlet being between the first heater and one end of the passage and the other outlet being between the second heater and the other end of the passage, the latter outlet being adapted to communicate with a chromatographic detector whereby said inert gas introduced into the passage at said point between said heaters sweeps over said carrier in opposite directions in the regions of said heaters.

2. Mass detector apparatus according to claim 1, wherein the carrier member is a wire.

3. Mass detector apparatus according to claim 2, wherein the wire passes from one end of the tubular passage to the other end thereof.

4. Mass detector apparatus for a liquid chromatographic column comprising an egress opening to said column, a probe adapted to engage eluent from the opening, an upright gas tube having an upper and lower egress opening and an intermediate inlet for an inert gas, means supporting said probe and extending within said tube, means for raising and lowering the probe away from and into the eluent from the column egress opening, a first heater situated near the lower end of the tube, a second heater situated between the inlet and the said upper egress opening, and a chromatographic detector disposed to receive eluent from the said upper egress opening.

5. Mass detector apparatus according to claim 4, in which the first heater is adapted to vaporize the eluent from the material picked up by the probe, and in which the second heater is adapted to pyrolize the residue left by the eluent.

References Cited by the Examiner
UNITED STATES PATENTS 3,128,619   4/1964   Lieberman _____ 73—23.1

RICHARD C. QUEISSER, *Primary Examiner.*

JULIUS FISHER, *Assistant Examiner.*